United States Patent
Chang et al.

(10) Patent No.: US 9,045,633 B1
(45) Date of Patent: Jun. 2, 2015

(54) THERMOPLASTIC POLYCARBONATE RESIN COMPOSITION

(71) Applicants: HYUNDAI MOBIS CO., LTD., Seoul (KR); LG CHEM. LTD., Seoul (KR)

(72) Inventors: Jae Joon Chang, Suwon-si (KR); Hyeon Don Kim, Yongin-si (KR); Yong Chun, Suwon-si (KR); Myeung Il Kim, Daejeon (KR); Jong Kuk Choi, Daejeon (KR); Yong Kim, Daejeon (KR); Sung Ho Lee, Daejeon (KR); Dae Yong Ok, Daejeon (KR)

(73) Assignees: Hyundai Mobis Co., Ltd., Seoul (KR); LG Chem. Ltd., Seoul (KR)

( * ) Notice: Subject to any disclaimer, the term of this patent is extended or adjusted under 35 U.S.C. 154(b) by 0 days.

(21) Appl. No.: 14/322,585

(22) Filed: Jul. 2, 2014

(30) Foreign Application Priority Data

Dec. 9, 2013 (KR) ........................ 10-2013-0152218

(51) Int. Cl.
*C08G 64/00* (2006.01)
*C08L 69/00* (2006.01)
*C08G 63/02* (2006.01)

(52) U.S. Cl.
CPC ...................................... *C08L 69/00* (2013.01)

(58) Field of Classification Search
USPC .................. 524/451, 464, 505; 523/122, 351; 528/196, 198
See application file for complete search history.

(56) References Cited

U.S. PATENT DOCUMENTS

| | | | |
|---|---|---|---|
| 4,180,494 A | 12/1979 | Fromuth et al. | |
| 4,393,153 A | 7/1983 | Hepp | |
| 4,906,202 A | 3/1990 | Germ | |

*Primary Examiner* — Terressa Boykin
(74) *Attorney, Agent, or Firm* — Knobbe Martens Olson & Bear, LLP

(57) ABSTRACT

A thermoplastic polycarbonate resin composition may include about 50 to about 70 wt % of a polycarbonate resin; about 5 to about 20 wt % of a vinyl cyanide compound-conjugated diene-vinyl aromatic hydrocarbon copolymer; about 10 to about 30 wt % of a polyester resin; about 3 to about 15 wt % of a maleimide-based copolymer; about 2 to about 10 wt % of an impact modifier; and about 0.1 to about 1.0 wt % of a nucleating agent, wherein the polycarbonate resin has a melt index of about 2 to about 20 g/10 min (300° C., 2.16 kg). The thermoplastic polycarbonate resin composition has excellent chemical resistance and mechanical properties.

13 Claims, No Drawings

THERMOPLASTIC POLYCARBONATE RESIN COMPOSITION

CROSS-REFERENCES TO RELATED APPLICATIONS

The present application claims priority under 35U.S.C 119(a) to Korean Patent Application No. 10-2013-0152218, filed on Dec. 9, 2013, in the Korean Intellectual Property Office, which is incorporated herein by reference in its entirety set forth in full.

BACKGROUND

Exemplary embodiments of the present invention relate to a thermoplastic polycarbonate resin composition, and more particularly, to a thermoplastic polycarbonate resin composition which has excellent chemical resistance, stiffness, heat resistance and impact resistance, and this is very suitable for use as an interior material for a vehicle.

In recent years, with the demand for lightweight and environmentally friendly materials in the vehicle field, etc., plastic components have been substituted for components made metals and crosslinked rubber. Accordingly, thermoplastic resins have been increasingly used, which have low specific gravity and good processability and are recyclable.

Polycarbonate (PC) resin that is a typical thermoplastic resin has excellent mechanical properties, impact resistance and heat resistance, and thus has been widely used for various mechanical parts or in the vehicle field.

However, this PC resin has a disadvantage of poor formability, and thus is allowed with acrylonitrile-butadiene-styrene (ABS) resin to improve the formability.

Meanwhile, the PC/ABS alloy has excellent mechanical properties, dimensional stability and flowability, and thus has been widely used for audio systems, knobs, center fascias and the like for vehicles.

However, this PC/ABS resin has problems in that it has poor resistance to external chemicals and in that when it is brought into contact with chemicals such as aromatics and sun creams by the user, physical and chemical reactions occur to cause surface damage and product breakage.

To overcome such problems, an attempt was made to enhance the chemical resistance of the PC/ABS resin by adding crystalline resins such as PBT. However, there are problems in that mechanical properties suitable for vehicle interior materials are not satisfied and stiffness, impact resistance and heat resistance are reduced.

In addition, U.S. Pat. Nos. 4,393,153, 4,180,494, and 4,906,202, for example, proposed methods of adding an ethylene-propylene copolymer (EPR), EPDM, MBS and the like, but these methods could not solve the above-described problems.

SUMMARY

An embodiment of the present invention relates to a thermoplastic polycarbonate resin composition which has excellent chemical resistance so as not to be damaged even by external chemicals, and at the same time, has excellent mechanical properties, including stiffness, impact resistance and heat resistance, and thus can be widely used in the electrical/electronic field, the industrial material field and the field of vehicle interior components, and particularly, can satisfy the optimal requirements for vehicle interior materials.

In one embodiment, a thermoplastic polycarbonate resin composition includes about 50 to about 70 wt % of a polycarbonate resin, about 5 to about 20 wt % of a vinyl cyanide compound-conjugated diene-vinyl aromatic hydrocarbon copolymer, about 10 to about 30 wt % of a polyester resin, about 3 to about 15 wt % of a maleimide-based copolymer, about 2 to about 10 wt % of an impact modifier, and about 0.1 to about 1.0 wt % of a nucleating agent, wherein the polycarbonate resin has a melt index of about 2 to about 20 g/10 min (300° C., 2.16 kg).

In one embodiment, the polycarbonate resin may have a weight-average molecular weight of about 30,000 to about 80,000 g/mol.

In another embodiment, the vinyl cyanide compound-conjugated diene-vinyl aromatic hydrocarbon copolymer may be a copolymer in which an aromatic vinyl compound and a vinyl cyanide compound are grafted to conjugated diene-based rubbery polymer.

In another embodiment, the conjugated diene-based rubbery polymer may have an average diameter between about 0.1 μm to about 2 μm.

In another embodiment, the polyester resin may include at least one of polyethylene terephthalate, polybutylene terephthalate, polyhexamethylene terephthalate, polycyclohexane dimethylene terephthalate, and polytrimethylene terephthalate.

In another embodiment, the polyester resin may have an intrinsic viscosity (n) of about 0.7 to about 1.4 dl/g.

In another embodiment, the maleimide-based copolymer is a terpolymer of aromatic vinyl compound, N-substituted maleimide-based compound and maleic anhydride.

In another embodiment, the maleimide-based copolymer may have a weight-average molecular weight of about 10,000 to about 150,000 g/mol.

In another embodiment, the impact modifier may be a core shell graft copolymer.

In another embodiment, the nucleating agent may have an average diameter of about 1 μm to about 10 μm.

In another embodiment, the resin composition may further include at least one additive of a transesterification inhibitor, an antioxidant, a lubricant, a UV stabilizer, a compatibilizer, a pigment, a dye, an inorganic additive, a coupling agent, an impact modifier, an antistatic agent, an anti-wear agent, an antibacterial agent, and mixtures thereof.

In another embodiment, the resin composition may have a melt index of about 4 to about 6 g/10 min as measured in accordance with ASTM D1238 (250° C., 2.16 kg), a tensile strength of about 600 to about 850 Kgf/cm2 as measured in accordance with ASTM D638 (specimen thickness: 3.2 mm; 23° C.), and an Izod impact strength of about 20 to about 60 Kgf·cm/cm as measured in accordance with ASTM D256 (specimen thickness: 6.4 mm; −40° C.).

In another embodiment, an interior material for a vehicle includes the above-described thermoplastic polycarbonate resin composition.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Thermoplastic Polycarbonate Resin Composition

In one embodiment, the present invention provides thermoplastic resin composition comprises about 50 to about 70 wt % of a polycarbonate resin, about 5 to about 20 wt % of a vinyl cyanide compound-conjugated diene-vinyl aromatic hydrocarbon copolymer, about 10 to about 30 wt % of a polyester resin, about 3 to about 15 wt % of a maleimide-based copolymer, about 2 to about 10 wt % of an impact modifier, and about 0.1 to about 1.0 wt % of a nucleating agent, wherein the polycarbonate resin has a melt index of about 2 to about 20 g/10 min (300° C., 2.16 kg).

The components of the thermoplastic polycarbonate resin composition according to the present invention will now be described in detail.

(A) Polycarbonate Resin

The polycarbonate resin can be prepared by reacting an aromatic dihydroxy compound with a compound selected from among phosgene or carbonate precursors.

More specifically, the polycarbonate resin can be prepared either by reacting an aromatic dihydroxy compound with phosgene or by transesterification between an aromatic dihydroxy compound and a carbonate precursor such as diphenyl carbonate, diaryl carbonate or ethylene carbonate.

Examples of the aromatic dihydroxy compound include bis(4-hydroxyphenyl)methane, 1,1-bis(4-hydroxyphenyl)ethane, 2,2-bis(4-hydroxyphenol)propane(bisphenol A), 2,2-bis(4-hydroxyphenyl)butane, 1,1-bis(4-hydroxyphenyl)cyclopentane, 1,1-bis(4-hydroxyphenyl)cyclohexane, bis(4-hydroxyphenyl)ether, bis(4-hydroxypheny)sulfide, and aromatic dihydroxy compounds substituted with an alkyl or halogen. Preferably, 2,2-bis(4-hydroxyphenol)propane (bisphenol A) may be used in the present invention, The polycarbonate resin may be a homopolymer, a copolymer of two or more aromatic dihydroxy compounds, a polycarbonate copolymer, a polycarbonate-polysiloxane copolymer, or a mixture of such resins.

In addition to this bisphenol A-based linear polycarbonate, a branched polycarbonate prepared by reacting a multifunctional aromatic compound such as trimellitic anhydride or trimellitic acid with an aromatic dihydroxy compound and a carbonate precursor may be used in the present invention.

In an embodiment of the present invention, the polycarbonate resin may have a weight-average molecular weight of about 30,000 to about 80,000 g/mol, and preferably about 40,000 to about 70,000 g/mol. In this weight-average molecular weight range, the polycarbonate resin has excellent chemical resistance, mechanical properties, formability and impact resistance.

The melt index of the polycarbonate resin may be about 2 to about 20 g/10 min at a temperature of 300° C. and a load of 1.2 kg. For example, the melt index of the polycarbonate resin may be 2, 3, 4, 5, 6, 7, 8, 9, 10, 11, 12, 13, 14, 15, 16, 17, 18, 19 or 20 g/10 min at a temperature of 300° C. and a load of 1.2 kg. If the melt index of the polycarbonate resin is lower than 2 g/10 min, the formability of the polycarbonate resin will be reduced, making it difficult to form a complex structure, and if the melt index of the polycarbonate resin is higher than 20 g/10 min, the polycarbonate resin will have a low molecular weight, and thus have significantly low mechanical properties and chemical resistance.

The polycarbonate resin is contained in an amount of about 50 to about 70 wt %, for example, 51, 52, 53, 54, 55, 56, 57, 58, 59, 60, 61, 62, 63, 64, 65, 66, 67, 68, 69 or 70 wt %, based on the total weight of the thermoplastic polycarbonate resin composition. Preferably, the content of the polycarbonate resin in the composition may be about 60 to about 65 wt %. If the content of the polycarbonate resin in the composition is less than 50 wt %, the heat resistance and stiffness of the thermoplastic polycarbonate resin composition will be reduced, and if the content of the polycarbonate resin is more than 70 wt %, the chemical resistance and formability of the composition will be reduced.

(B) Vinyl Cyanide Compound-Conjugated Diene-Vinyl Aromatic Hydrocarbon Copolymer The vinyl cyanide compound-conjugated diene-vinyl aromatic hydrocarbon copolymer may be a copolymer in which an aromatic vinyl compound and a vinyl cyanide compound are grafted to a conjugated diene-based rubbery polymer.

In an embodiment of the present invention, the vinyl cyanide compound-conjugated diene-vinyl aromatic hydrocarbon copolymer can be prepared by graft polymerization of a conjugated diene-based rubbery polymer with a monomer compound including an aromatic vinyl compound and a vinyl cyanide compound. For example, the vinyl cyanide compound-conjugated diene-vinyl aromatic hydrocarbon copolymer can be prepared by a continuous bulk polymerization process.

In an embodiment of the present invention, the conjugated diene-based rubbery polymer may be 1,3-butadiene, 2,3-dimethyl-1,3-butadiene, piperylene, 3-butyl-1,3-octadiene, iroprene, or 2-pheny-1,3-butadiene. These may be used alone or in a mixture of two or more. Preferably, the conjugated diene-based rubbery polymer may be butadiene.

In an embodiment of the present invention, the conjugated diene-based rubbery polymer may have an average diameter of about 0.1 to about 2 μm, and preferably about 0.5 to about 1.5 μm. In this average diameter, the impact strength, formability and surface properties of the thermoplastic resin composition according to the present invention can be prevented from being reduced.

Examples of the aromatic vinyl compound include styrene, α-methyistyrene, o-ethylstyrene, p-ethylstyrene, vinyl toluene, and derivatives thereof. Preferably, styrene or α-methylstyrene may be used. The aromatic vinyl compound may be contained in an amount of about 30 to about 70 wt % based on the total weight of the vinyl cyanide compound-conjugated diene-vinyl aromatic hydrocarbon copolymer taken as 100 wt %.

Examples of the vinyl cyanide compound include acrylonitrile, methacrylonitrile, ethacrylonitrile, and derivatives thereof. Preferably, acrylonitrile may be used. The vinyl cyanide compound may be contained in an amount of about 5 to about 20 wt % based on the total weight of the vinyl cyanide compound-conjugated diene-vinyl aromatic hydrocarbon copolymer taken as 100 wt %.

In the present invention, the vinyl cyanide compound-conjugated diene-vinyl aromatic hydrocarbon copolymer may be contained in an amount of about 5 to about 20 wt %, for example, 5, 6, 7, 8, 9, 10, 11, 12, 13, 14, 15, 16, 17, 18, 19 or 20 wt %, and preferably about 5 to about 10 wt %, based on the total weight of the thermoplastic polycarbonate resin composition taken as 100 wt %. If the content of the vinyl cyanide compound-conjugated diene-vinyl aromatic hydrocarbon copolymer in the composition is less than 5 wt %, the effect of enhancing the impact resistance of the composition will be insufficient, and if the content of the vinyl cyanide compound-conjugated diene-vinyl aromatic hydrocarbon copolymer is more than 20 wt %, the formability, chemical resistance and heat resistance of the resin composition will be reduced.

(C) Polyester Resin

The polyester resin can be prepared by esterification of a diol compound with a compound selected from terephthalic acid and alkyl terephthalate. More specifically, the polyester resin may be an aromatic polyester resin prepared by the direct esterification or transesterification (polycondensation) of a diol compound with terephthalic acid or alkyl terephthalate.

In an embodiment of the present invention, the polyester resin may comprise one or more of polyethylene terephthalate, polybutylene terephthalate, polyhexamethylene terephthalate, polycyclohexane dimethylene terephthalate, and polytrimethylene terephthalate. Preferably, it may be polyethylene terephthalate resin, polytrimethylene terephthalate resin or polybutylene terephthalate resin.

In an embodiment of the present invention, the polyester resin may have an intrinsic viscosity (q) of about 0.7 to about 1.4 dl/g, for example, 0.7, 0.8, 0.9, 1.0, 1.1, 1.2, 1.3 or 1.4 dl/g. Preferably, the intrinsic viscosity of the polyester resin may be about 0.8 to about 1.2 dl/g. In this intrinsic viscosity range, a reduction in the mechanical properties of the thermoplastic polycarbonate resin composition can be prevented, and a reduction in the flowability and formability of the composition can also be prevented.

The polyester resin may be contained in an amount of about 10 to about 30 wt %, for example, 11, 12, 13, 14, 15, 16, 17, 18, 19, 20, 21, 22, 23, 24, 25, 26, 27, 28, 29 or 30 wt %, and preferably about 10 to about 20 wt %, based on the total weight of the thermoplastic polycarbonate resin composition taken as 100 wt %. If the content of the polyester resin in the composition is less than 10 wt %, it will be difficult to improve the chemical resistance of the composition, and if the content of the polyester resin is more than 30 wt %, the heat resistance and impact resistance of the resin composition will be insufficient.

In addition, the content of polyester resin (Cw) in the thermoplastic polycarbonate resin composition may be higher than the content of vinyl cyanide compound-conjugated diene-vinyl aromatic hydrocarbon copolymer (Bw). In this case, it is possible to ensure more excellent resistance to environmental stress cracking. Further, the weight ratio of the polyester resin content (Cw) to the vinyl cyanide compound-conjugated diene-vinyl aromatic hydrocarbon copolymer content (Bw) may be Cw:Bw=3-4:1. In this content ratio range, the composition can have excellent heat resistance and mechanical strength together with excellent environmental stress cracking resistance.

(D) Maleimide-Based Copolymer

The maleimide-based copolymer functions to improve the heat resistance, stiffness and chemical resistance of the thermoplastic polycarbonate resin composition of the present invention.

In an embodiment of the present invention, the maleimide-based copolymer may be a terpolymer of aromatic vinyl compound, N-substituted maleimide compound-and maleic anhydride.

Examples of the aromatic vinyl compound in the terpolymer include styrene, α-methylstyrene, o-ethylstyrene, p-ethylstyrene, vinyl toluene, and derivatives thereof. Preferably, the aromatic vinyl compound may be styrene or α-methylstyrene. The aromatic vinyl compound may be contained in an amount of about 20 to about 80 wt %, for example, about 30 to about 70 wt %, based on the total weight of the melamine-based copolymer taken as 100 wt %.

Examples of the N-substituted maleimide compound include N-methylmaleimide, N-ethylmaleimide, N-propylmaleimide, N-t-butylmaleimide, N-isopropylmaleimide, N-cyclohexylmaleimide, N-phenylmaleimide, N-naphthylmaleimide, N-o-chlorophenylmaleimide and the like. These may be used alone or in a mixture of two or more. Among them, N-phenylmaleimide (PMI) is preferably used. The N-substituted maleimide compound may be contained in an amount of about 15 to about 70 wt %, for example, about 20 to about 60 wt %, based on the total weight of the maleimide-based copolymer taken as 100 wt %.

The maleic anhydride may be contained in an amount of about 2 to about 20 wt %, for example, about 5 to about 15 wt %, based on the total weight of the maleimide-based copolymer taken as 100 wt %.

In an embodiment of the present invention, the maleimide-based copolymer may have a weight-average molecular weight of about 10,000 to about 150,000 g/mol, preferably about 100,000 to about 150,000 g/mol. In this weight-average molecular weight range, reductions in the mechanical properties, chemical resistance, formability, processability and impact resistance of the thermoplastic polycarbonate resin composition according to the present invention can be prevented.

The maleimide-based copolymer may be contained in an amount of about 3 to about 15 wt %, for example, 3, 4, 5, 6, 7, 8, 9, 10, 11, 12, 13, 14 or 15 wt %, and preferably about 4 to about 8 wt %, based on the total weight of the thermoplastic polycarbonate resin composition taken as 100 wt %. If the content of the maleimide-based copolymer in the composition is less than 3 wt %, the effect of improving the heat resistance and chemical resistance of the composition will be insufficient, and if the content of the maleimide-based copolymer is more than 15 wt %, the impact resistance of the resin composition will be reduced and the flowability of the composition will be reduced, resulting in a reduction in the formability and processability of the composition.

In addition, the content of maleimide-based component (Dw) in the thermoplastic polycarbonate resin composition of the present invention may be smaller than the content of the vinyl cyanide compound-conjugated diene-vinyl aromatic hydrocarbon copolymer (Bw). In this case, the composition may have better impact strength. For example, the weight ratio of the maleimide-based component content (Dw) to the vinyl cyanide compound-conjugated diene-vinyl aromatic hydrocarbon copolymer content (Bw) may be Dw:Bw=1:1.1-2, and preferably Dw:Bw=1:1.1-1.5.

Moreover, the content of maleimide-based component (Dw) in the thermoplastic polycarbonate resin composition of the present invention may be smaller than the content of polyester resin (Cw). In this case, the composition may have better impact strength. For example, the weight ratio of the maleimide-based component content (Dw) to the polyester resin content (Cw) may be Dw:Cw=1:4.5-6. In this range, it is possible to ensure both excellent impact strength and heat resistance.

(E) Impact Modifier

The impact modifier that is used in the composition of the present invention may be a core shell graft copolymer.

In an embodiment of the present invention, the core shell graft copolymer can be prepared by graft polymerization of a rubbery core with a vinyl-based monomer.

Based the total weight of the core shell graft copolymer taken as 100 wt %, the rubbery core may be contained in an amount of about 5 to about 95 wt %, and the vinyl-based monomer may be contained in an amount of about 5 to about 95 wt %.

The rubbery core may be diene-based rubber, acrylic rubber, silicon-based rubber, or a mixture thereof.

Examples of the diene-based rubber include butadiene, isoprene and the like. Among them, butadiene may preferably be used. The acrylic rubber may be alkyl-substituted (meth) acrylate.

Examples of the silicon-based rubber include hexamethylcyclotrisiloxane, octamethylcyclotetrasiloxane, decamethylcyclopentasiloxane, dodecamethylcyclohexasiloxane and the like. These may be used alone or in a mixture of two or more.

The average diameter of rubber in the rubbery graft copolymer may be about 0.1 to about 0.5 μm. In this average diameter range, reductions in the impact strength, formability and surface properties of the thermoplastic polycarbonate resin composition according to the present invention can be prevented.

As the vinyl-based monomer, a vinyl aromatic hydrocarbon compound, alkyl(meth)acrylate and the like may be used alone or in a mixture of two or more.

Examples of the vinyl aromatic hydrocarbon compound include styrene, α-methylstyrene, o-ethylstyrene, p-ethylstyrene, vinyl toluene, and derivatives thereof. Preferably, styrene or α-methylstyrene may be used.

Examples of the vinyl cyanide compound include acrylonitrile, methacrylonitrile, ethacrylonitrile, and derivatives thereof. Preferably, acrylonitrile may be used.

Examples of the alkyl(meth)acrylate-based monomer include methyl(meth)acrylate, butyl(meth)acrylate, and benzyl(meth)acrylate, with methyl(meth)acrylate being preferred.

The impact modifier may be contained in an amount of about 2 to about 10 wt %, for example, 2, 3, 4, 5, 6, 7, 8, 9 and 10 wt %, and preferably about 4 to about 8 wt %, based on the total weight of the thermoplastic polycarbonate resin composition taken as 100 wt %. If the content of the impact modifier in the composition is less than 2 wt %, the effect of enhancing the impact strength of the composition will be insufficient, and if the content of the impact modifier is more than 10 wt %, the heat resistance, formability and processability of the resin composition will be reduced.

(F) Nucleating Agent

The nucleating agent that is used in the present invention may be an organic or inorganic nucleating agent.

Examples of the organic nucleating agent include metal salts such as an aluminum salt, a calcium salt and a sodium salt. For example, it may be aluminum para-tertiary butyl benzoate, sodium benzoate, calcium benzoate or the like. In addition, a sorbitol-based nucleating agent, a sorbitol-based derivative, may also be used.

Examples of the inorganic nucleating agent include silica, talc, mica, calcium carbonate, magnesium carbonate, calcium phosphate, calcium sulfate, barium sulfate, titanium oxide, zinc oxide, magnesium oxide and the like. Preferably, silica, talc, titanium oxide or the like may be used in the present invention. Most preferably, talc may be used.

In an embodiment of the present invention, the nucleating agent may have an average diameter of about 1 to about 10 μm. In this average diameter range, a reduction in the dispersibility of the nucleating agent particles due to the agglomeration of the particles can be prevented, and reductions in nucleation efficiency, surface smoothness and surface gloss can also be prevented.

In the present invention, the nucleating agent may be contained in an amount of about 0.1 to about −1.0 wt %, for example, 0.1, 0.2, 0.3, 0.4, 0.5, 0.6, 0.7, 0.8, 0.9 or 1.0 wt %, and preferably about 0.3 to about 0.8 wt %, based on the total weight of the thermoplastic polycarbonate resin composition taken as 100 wt %. If the content of the nucleating agent in the composition is less than 0.1 wt %, it will be difficult to obtain sufficient heat resistance of the composition, and if the content of the nucleating agent is more than 1.0 wt %, the heat resistance of the resin composition will not be improved, and other physical properties of the composition will be deteriorated.

When talc is used as the nucleating agent, it may be contained in an amount of about 0.1 to about 1.0 wt %, and preferably about 0.1 to about 0.5 wt % based on the total weight of the polycarbonate resin composition. In this content range, a reduction in the heat resistance and impact resistance of the resin composition can be prevented, and the appearance of the surface of the composition can be prevented from being deteriorated due to an excessive amount of inorganic material.

Other Additives

The thermoplastic polycarbonate resin composition according to the present invention may comprise, in addition to the above-described components, other additives that do not impair the purpose of the present invention.

In an embodiment of the present invention, examples of additives that may be used in the present invention include, but are not limited to, a transesterification inhibitor, an antioxidant, a lubricant, a UV stabilizer, a compatibilizer, a pigment, a dye, an inorganic additive, a coupling agent, an impact modifier, an antistatic agent, an anti-wear agent, an antibacterial agent, etc. These additives may be used alone or in a combination of two or more.

Because the composition of the present invention includes polymers containing ester and carbonate units, ester-carbonate exchange can decompose one or both the polymers. Thus, an inhibitor that suppresses this exchange is preferably added to the thermoplastic polycarbonate resin composition in an amount of about 0.01 to about 1 wt % based on the total weight of the composition taken as 100 wt %. This transesterification inhibitor may be one or more selected from the group consisting of hydroxyl aromatic compounds such as hydroxybenzophenone; salicylate compounds such methyl salicylate; and sodium and potassium dihydrogen phosphate. Preferably, sodium and potassium dihydrogen phosphate may be used.

The antioxidant that is used in the present invention may be a phenol-type, phosphate-type, thioether-type or amine-type antioxidant, and the releasing agent may be polyethylene wax, silicone oil, a metal salt of stearic acid, or the like. Also, the UV stabilizer may be a benzophenone-type, benzotriazole-type or benzotriazine-type stabilizer.

The filler that is used in the present invention may be glass fiber, carbon fiber, silica, mica or the like. Addition of such fillers can improve the physical properties (such as mechanical strength and heat resistance) of the composition.

The additives may be contained in an amount of about 0.1 to about 20 wt % based on the total weight of the thermoplastic polycarbonate resin composition taken as 100 wt %.

A method for kneading the resin composition may be any method known in the art and is not specifically limited. For example, a method of dry-blending the components and additives of the composition of the present invention and heating and melt-kneading the blend may be used. The kneading process may be performed at a temperature of about 230 to about 270° C., and preferably about 240 to about 260° C., so that the components can be physically and chemically sufficiently mixed with each other.

In an embodiment of the present invention, the resin composition may have a melt index of about 4 to about 6 g/10 min as measured in accordance with ASTM D1238 (250° C., 2.16 kg), a tensile strength of about 600 to about 850 Kgf/cm$^2$ as measured in accordance with ASTM D638 (specimen thickness: 3.2 mm; 23° C.), and an Izod impact strength of about 20 to about 60 Kgf.cm/cm as measured in accordance with ASTM D256 (specimen thickness: 6.4 mm; −40° C.).

In these ranges of physical property values, it can be seen that the thermoplastic polycarbonate resin composition according to the present invention has excellent chemical resistance so as not to be damaged even by contact with external chemicals, and at the same time, has excellent mechanical properties, including stiffness, impact resistance and heat resistance, and thus can be widely used in the electrical/electronic field, the industrial material field and the field of vehicle interior components, and particularly, can satisfy the optimal requirements for vehicle interior materials (see Tables 4 to 6 below).

Interior Material for Vehicle

In another embodiment, a vehicle interior material comprises the thermoplastic polycarbonate resin composition as described above.

An interior material is disposed in various portions of a vehicle to provide sound insulation, sound absorption and a more beautiful appearance. This interior material is used in a vehicle inner ceiling, the inner side of a vehicle door, the shelf of a vehicle's backseat, and the like, and is generally composed of a surface material bonded to the backside of a pad.

More specifically, different interior materials for a vehicle are disposed in a crash pad in the front of a driver's seat and a passenger seat in a vehicle, a panel near an instrument panel assembled with the crash pad, a center fascia panel (in which an audio system, a cup holder, an ash tray and the like are mounted), a headliner (ceiling material), and the like.

The vehicle interior material comprising the thermoplastic polycarbonate resin composition according to the present invention has excellent chemical resistance together with excellent stiffness, impact resistance and heat resistance, and thus satisfies the optimal requirements for vehicle interior materials.

The characteristics and other advantages of the present invention as described above will be more apparent from the following examples and comparative examples. However, the scope of the present invention is not limited to these examples.

EXAMPLES

The specifications of each of the components (A to F) used in the following examples and comparative example to the thermoplastic polycarbonate resin composition of the present invention are as follows.

(A) Polycarbonate Resin

PC-1: Polycarbonate resin (LG Chemical Co., Ltd.) having a melt index of 15 g/10 min (ASTM D1238, 300° C., 1.2 Kgf) was used.

PC-2: Polycarbonate resin (LG Chemical Co., Ltd.) having a melt index of 30 g/10 min (ASTM D1238, 300° C., 1.2 Kgf) was used.

(B) Acrylonitrile-Conjugated Diene-Styrene Copolymer

MA201 (LG Chemical Co., Ltd.) that is acrylonitrile-butadiene-styrene (ABS) was used.

(C) Polyester Resin 1200-211M (Changchun Co., Ltd.; intrinsic viscosity (η): 0.83 dl/g) that is a polybutylene terephthalate (PBT) resin was used.

(D) Maleimide-Based Copolymer

MS-NB (DENKA Co., Ltd.) was used.

(E) Impact Modifier

EM-500 (LG Chemical Co., Ltd.) that is a graft copolymer composed of a rubbery butadiene core and an acrylate shell was used as an impact modifier.

(F) Nucleating Agent

KC-3000 (KOCH Co., Ltd.) that is talc having an average particle diameter of 5-6 μm was used.

Examples 1 to 3 and Comparative Examples 1 to 12

According to the composition ratios shown in Tables 1 to 3 below, the above components (A to F) were melt-mixed and kneaded in a twin screw extruder at 250° C., and then pellets were prepared therefrom.

TABLE 1

| | | Example 1 | Example 2 | Example 3 | Comp. Example 1 | Comp. Example 2 |
|---|---|---|---|---|---|---|
| A | PC-1 | 63 | 62.8 | 62.6 | 70 | — |
|   | PC-2 | — | — | — | — | 70 |
| B |   | 5 | 5 | 5 | 30 | 30 |
| C |   | 20 | 19.8 | 19.6 | — | — |
| D |   | 4 | 4 | 4 | — | — |
| E |   | 7.5 | 8 | 8 | — | — |
| F |   | 0.5 | 0.4 | 0.8 | — | — |

TABLE 2

| | | Comp. Example 3 | Comp. Example 4 | Comp. Example 5 | Comp. Example 6 | Comp. Example 7 |
|---|---|---|---|---|---|---|
| A | PC-1 | 70 | 80 | 40 | 65 | 65 |
|   | PC-2 | — | — | — | — | — |
| B |   | 10 | 15 | 20 | 10 | — |
| C |   | 20 | 5 | 40 | 20 | 20 |
| D |   | — | — | — | — | — |
| E |   | — | — | — | 5 | 15 |
| F |   | — | — | — | — | — |

TABLE 3

| | | Comp. Example 8 | Comp. Example 9 | Comp. Example 10 | Comp. Example 11 | Comp. Example 12 |
|---|---|---|---|---|---|---|
| A | PC-1 | 70 | 55 | 62.5 | 45 | — |
|   | PC-2 | — | — | — | 40 | — |
| B |   | 8 | 5 | 5 | 22 | 4 |
| C |   | 20 | 20 | 19.3 | 8 | 32 |
| D |   | 2 | 20 | 4 | 12 | 2 |
| E |   | — | — | 8 | 12 | 20 |
| F |   | — | — | 1.5 | 1 | 2 |

Test Examples

The pellets prepared from each of the thermoplastic polycarbonate resin compositions of Examples 1 to 3 and Comparative Examples 1 to 12 were molded into a test specimen using an injection molding machine. Then, the physical properties of each specimen were evaluated in the following manner, and the results of the evaluation are shown in Tables 4 to 6 below.

Specific methods for measuring the physical properties of the specimen are as follows.

Methods for Measurement of Physical Properties (1) Melt flow index (MFI): measured in accordance with ASTM D1238 (250° C., 2.16 kg) and expressed in units of g/10 min.

(2) Tensile strength: measured in accordance with ASTM D 638 (specimen thickness: 3.2 mm; 23° C.) and expressed in units of Kgf/cm$^2$.

(3) Flexural strength: measured in accordance with ASTM D 790 (specimen thickness: 6.4 mm; 23° C.) and expressed in units of Kgf/cm$^2$.

(4) Flexural modulus: measured in accordance with ASTM D 790 (specimen thickness: 6.4 mm; 23° C.) and expressed in units of Kgf/cm$^2$.

(5) IZOD impact strength: measured in accordance with ASTM D 256 (specimen thickness: 6.4 mm) at 23° C. and −40° C. and expressed in units of Kgf·cm/cm.

(6) Environmental stress cracking resistance (ESCR): In accordance with ASTM D 543, an aromatic was applied to a tensile strength specimen (thickness: 3.2 mm) on a 1.0% strain jig, and then a change in the appearance was observed. The results of the observation were rated on level A (no crack) to level D (break) according to the degree of cracking.

TABLE 4

|  | Example 1 | Example 2 | Example 3 | Comp. Example 1 | Comp. Example 2 |
|---|---|---|---|---|---|
| Melt index (g/10 min) | 4.3 | 4.2 | 4.1 | 5 | 8.5 |
| Tensile strength (Kgf/cm$^2$) | 630 | 640 | 642 | 520 | 518 |
| Flexural strength (Kgf/cm$^2$) | 850 | 860 | 862 | 790 | 785 |
| Flexural modulus (Kgf/cm$^2$) | 22,100 | 22,500 | 22,600 | 20,500 | 20,300 |
| Izod strength (23° C.) (Kgf.cm/cm) | 64 | 63 | 62 | 68 | 67 |
| Izod strength (−40° C.) (Kgf.cm/cm) | 22 | 22 | 21 | 24 | 23 |
| HDT (° C.) | 100 | 102 | 103 | 112 | 111 |
| ESCR[1] | A | A | A | C | D |

[1] A: No crack, B: crack, C: severe crack, D: break.

TABLE 5

|  | Comp. Example 3 | Comp. Example 4 | Comp. Example 5 | Comp. Example 6 | Comp. Example 7 |
|---|---|---|---|---|---|
| Melt index (g/10 min) | 6.8 | 6 | 10.2 | 4.8 | 3.5 |
| Tensile strength (Kgf/cm$^2$) | 522 | 540 | 515 | 510 | 490 |
| Flexural strength (Kgf/cm$^2$) | 787 | 800 | 760 | 760 | 740 |
| Flexural modulus (Kgf/cm$^2$) | 20,400 | 21,600 | 20,000 | 19,100 | 18,000 |
| Izod strength (23° C.) (Kgf.cm/cm) | 60 | 62 | 58 | 63 | 68 |
| Izod strength (−40° C.) (Kgf.cm/cm) | 13 | 14 | 11 | 18 | 26 |
| HDT (° C.) | 98 | 120 | 85 | 95 | 90 |
| ESCR[1] | A | B | A | A | A |

[1] A: No crack, B: crack, C: severe crack, D: break.

TABLE 6

|  | Comp. Example 8 | Comp. Example 9 | Comp. Example 10 | Comp. Example 11 | Comp. Example 12 |
|---|---|---|---|---|---|
| Melt index (g/10 min) | 5 | 3.8 | 4.1 | 6.0 | 7.0 |
| Tensile strength (Kgf/cm$^2$) | 540 | 670 | 645 | 410 | 560 |
| Flexural strength (Kgf/cm$^2$) | 800 | 880 | 865 | 650 | 810 |
| Flexural modulus (Kgf/cm$^2$) | 21,000 | 24,000 | 22,800 | 17,000 | 21,500 |
| Izod strength (23° C.) (Kgf.cm/cm) | 57 | 52 | 58 | 65 | 62 |
| Izod strength (−40° C.) (Kgf.cm/cm) | 10 | 5 | 18 | 26 | 24 |
| HDT (° C.) | 99 | 104 | 103 | 92 | 85 |
| ESCR[1] | A | A | A | C | A |

[1] A: No crack, B: crack, C: severe crack, D: break.

Results of Measurement of Physical Properties

The results of measurement of the physical properties of the thermoplastic polycarbonate resin composition according to the present invention are shown in Tables 4 to 6 above.

As can be seen in Tables 4 to 6 above, in the case of Comparative Examples 1 and 2 in which the composition consists only of polycarbonate resin and acrylonitrile-butadiene-styrene resin, the chemical resistance of the composition is significantly low, and the chemical resistance of the composition significantly decreases as the molecular weight of the polycarbonate resin decreases.

In the case of Comparative Example 3, the chemical resistance of the composition is increased due to the addition of polybutylene terephthalate resin, but in the case of Comparative Examples 4 and 5, when the content of polybutylene terephthalate resin is lower than a suitable level, the effect of improving the chemical resistance of the composition can be insignificant, whereas, when the content of polybutylene terephthalate resin is higher than a suitable level, the chemical resistance is not further improved, the impact resistance and heat resistance of the composition decrease rather than increase.

In the case of Comparative Examples 3, 8 and 9, as the content of the maleimide-based copolymer in the composition increases, the heat resistance and stiffness of the composition increase, but when the content of the maleimide-based copolymer is higher than a suitable level, the flowability and impact resistance of the composition decrease.

In the case of Comparative Examples 6 and 7, as the content of the rubbery graft copolymer in the composition increases, the impact resistance of the composition increases, but the flowability and heat resistance of the composition decrease. Also, in the case of Examples 3 and Comparative Example 10, when the content of the nucleating agent in the composition is higher than a suitable level, the heat resistance of the composition does not further increase, and the impact strength of the composition decreases rather than increases.

Particularly, in the case of Comparative Examples 11 and 12, when the polycarbonate resin composition is out of the optimal composition ratio range of the present invention, the effect of improving the chemical resistance of the composition is insignificant, and the mechanical properties are also significantly reduced.

Accordingly, from the results in Tables 4 to 6 above, it can be seen that, when a combination of the optimal composition ratios as described in Examples 1 to 3 is used, the composition has excellent chemical resistance while having a balance of excellent mechanical properties, including stiffness, impact resistance and heat resistance.

As described above, the thermoplastic polycarbonate composition according to the present invention comprises the polycarbonate resin, the vinyl cyanide compound-butadiene-vinyl aromatic hydrocarbon copolymer, the polyester resin, the maleimide-based copolymer, the impact modifier and the nucleating agent at the optimal composition ratio. Accordingly, thermoplastic polycarbonate composition according to the present invention has excellent chemical resistance so as not to be damaged even by contact with external chemicals, and at the same time, has excellent mechanical properties, including stiffness, impact resistance and heat resistance, and thus can be widely used in the electrical/electronic field, the industrial material field and the field of vehicle interior components, and particularly, can satisfy the optimal requirements for vehicle interior materials (see Tables 4 to 6 above).

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A thermoplastic polycarbonate resin composition comprising:
   about 50 to about 70 wt % of a polycarbonate resin;
   about 5 to about 20 wt % of a vinyl cyanide compound-conjugated diene-vinyl aromatic hydrocarbon copolymer;
   about 10 to about 30 wt % of a polyester resin;
   about 3 to about 15 wt % of a maleimide-based copolymer;
   about 2 to about 10 wt % of an impact modifier; and
   about 0.1 to about 1.0 wt % of a nucleating agent,
   wherein the polycarbonate resin has a melt index of about 2 to about 20 g/10 min (300° C., 2.16 kg).

2. The thermoplastic polycarbonate resin composition of claim 1, wherein the polycarbonate resin has a weight-average molecular weight of about 30,000 to about 80,000 g/mol.

3. The thermoplastic polycarbonate resin composition of claim 1, wherein the vinyl cyanide compound-conjugated diene-vinyl aromatic hydrocarbon copolymer is a copolymer in which an aromatic vinyl compound and a vinyl cyanide compound are grafted to a conjugated diene-based rubbery polymer.

4. The thermoplastic polycarbonate resin composition of claim 3, wherein the conjugated diene-based rubbery polymer has an average diameter of about 0.1 μm to about 2 μm.

5. The thermoplastic polycarbonate resin composition of claim 1, wherein the polyester resin comprises at least one of polyethylene terephthalate, polybutylene terephthalate, polyhexamethylene terephthalate, polycyclohexane dimethylene terephthalate, and polytrimethylene terephthalate.

6. The thermoplastic polycarbonate resin composition of claim 1, wherein the polyester resin has an intrinsic viscosity (η) of about 0.7 to about 1.4 dl/g.

7. The thermoplastic polycarbonate resin composition of claim 1, wherein the maleimide-based copolymer is a terpolymer of aromatic vinyl compound, N-substituted maleimide compound and maleic anhydride.

8. The thermoplastic polycarbonate resin composition of claim 7, wherein the maleimide-based copolymer has a weight-average molecular weight of about 10,000 to about 150,000 g/mol.

9. The thermoplastic polycarbonate resin composition of claim 1, wherein the impact modifier is a core shell graft copolymer.

10. The thermoplastic polycarbonate resin composition of claim 1, wherein the nucleating agent has an average diameter of about 1 μm to about 10 μm.

11. The thermoplastic polycarbonate resin composition of claim 1, wherein the resin composition further comprises at least one additive of a transesterification inhibitor, an antioxidant, a lubricant, a UV stabilizer, a compatibilizer, a pigment, a dye, an inorganic additive, a coupling agent, an impact modifier, an antistatic agent, an anti-wear agent, an antibacterial agent, and mixtures thereof.

12. The thermoplastic polycarbonate resin composition of claim 1, wherein the resin composition has a melt index of about 4 to about-6 g/10 min as measured in accordance with ASTM D1238 (250° C., 2.16 kg), a tensile strength of about 600 to about 850 Kgf/cm$^2$ as measured in accordance with ASTM D638 (specimen thickness: 3.2 mm; 23° C.), and an Izod impact strength of about 20 to about 60 Kgf.cm/cm as measured in accordance with ASTM D256 (specimen thickness: 6.4 mm; −40° C.).

13. An interior material for a vehicle, which comprises the thermoplastic polycarbonate resin composition of claim 1.

* * * * *